US008478374B2

(12) United States Patent
Maguire et al.

(10) Patent No.: US 8,478,374 B2
(45) Date of Patent: Jul. 2, 2013

(54) SUPERCONDUCTING CABLE ASSEMBLY AND METHOD OF ASSEMBLY

(75) Inventors: James F. Maguire, Andover, MA (US); Jie Yuan, South Grafton, MA (US); Christopher G. King, Worcester, MA (US)

(73) Assignee: American Superconductor Corporation, Devens, MA (US)

( * ) Notice: Subject to any disclaimer, the term of this patent is extended or adjusted under 35 U.S.C. 154(b) by 1112 days.

(21) Appl. No.: 12/057,804

(22) Filed: Mar. 28, 2008

(65) Prior Publication Data

US 2009/0247412 A1  Oct. 1, 2009

(51) Int. Cl.
*H01B 12/00* (2006.01)
(52) U.S. Cl.
USPC .................................. 505/230; 174/125.1
(58) Field of Classification Search
USPC .................................. 505/230; 17/125.1
See application file for complete search history.

(56) References Cited

U.S. PATENT DOCUMENTS

| | | | |
|---|---|---|---|
| 3,595,982 A | | 7/1971 | Kafka |
| 3,826,286 A | * | 7/1974 | Beck .............................. 138/114 |
| 4,783,230 A | * | 11/1988 | Perkins .......................... 156/117 |
| 4,947,007 A | | 8/1990 | Dew et al. |
| 2002/0148101 A1 | | 10/2002 | Hirose et al. |
| 2002/0170733 A1 | * | 11/2002 | Rasmussen .................. 174/68.1 |
| 2003/0164246 A1 | * | 9/2003 | Nassi et al. ................. 174/125.1 |
| 2004/0092868 A1 | * | 5/2004 | Murray, III .............. 604/103.04 |
| 2004/0102329 A1 | * | 5/2004 | Mele .............................. 505/100 |
| 2008/0180202 A1 | | 7/2008 | Otto et al. |
| 2010/0021113 A1 | * | 1/2010 | Ashibe ........................... 385/95 |

FOREIGN PATENT DOCUMENTS

| | | |
|---|---|---|
| GB | 2206440 | 1/1989 |
| JP | 0950719 | 2/1997 |
| WO | WO 2008/011184 | 1/2008 |

OTHER PUBLICATIONS

Masur, L.J., et al. "Industrial HTS Conductors: Status and Applications" *EUCAS*, Sorrento, Italy, Sep. 15-18, 2003 (9 pages).

* cited by examiner

*Primary Examiner* — Paul Wartalowicz
(74) *Attorney, Agent, or Firm* — Occhiuti Rohlicek & Tsao LLP

(57) ABSTRACT

An HTS cable assembly is provided which includes a cryostat or housing, an HTS wire bundle disposed longitudinally within the cryostat, and plural support members disposed between the HTS wire bundle and the cryostat. The support members are elongate, tubular members having resiliency in both the axial and radial directions. The support members are disposed between the HTS wire bundle and the inner surface of the cryostat in an arrangement that maintains and supports the HTS wire bundle in a spaced-apart relationship with respect to the inner surface of the cryostat. In addition, the plural support members are configured to substantially prevent relative movement between the HTS wire bundle and the cryostat.

29 Claims, 8 Drawing Sheets

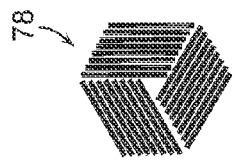
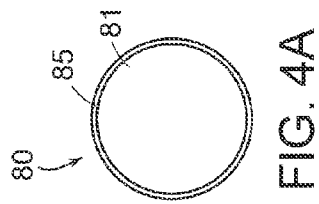
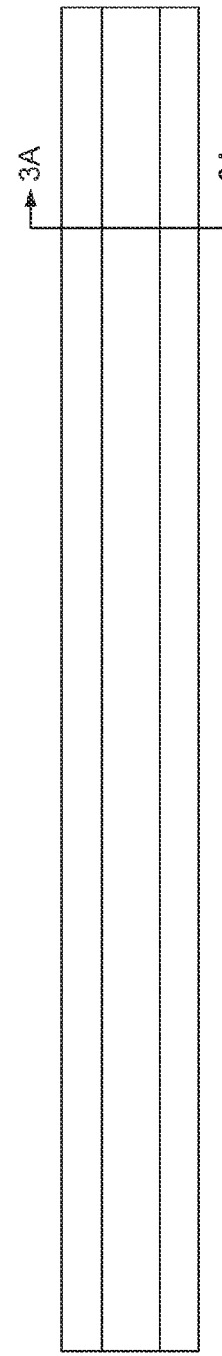
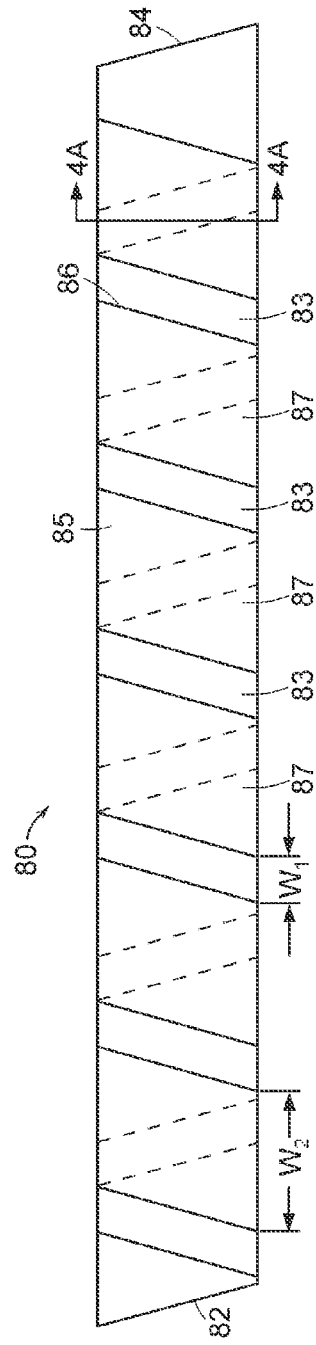
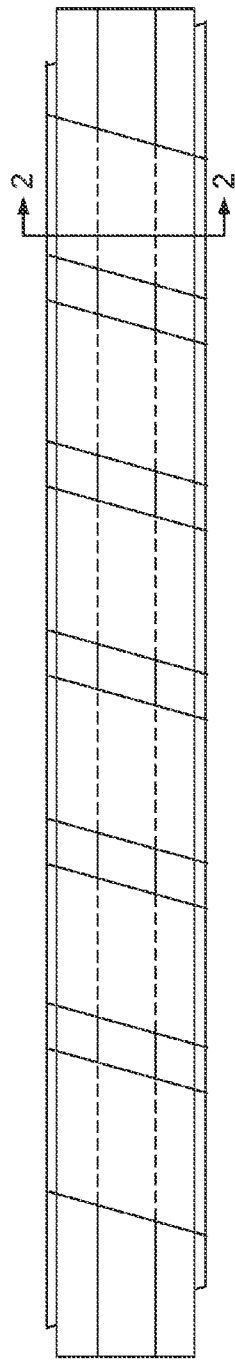

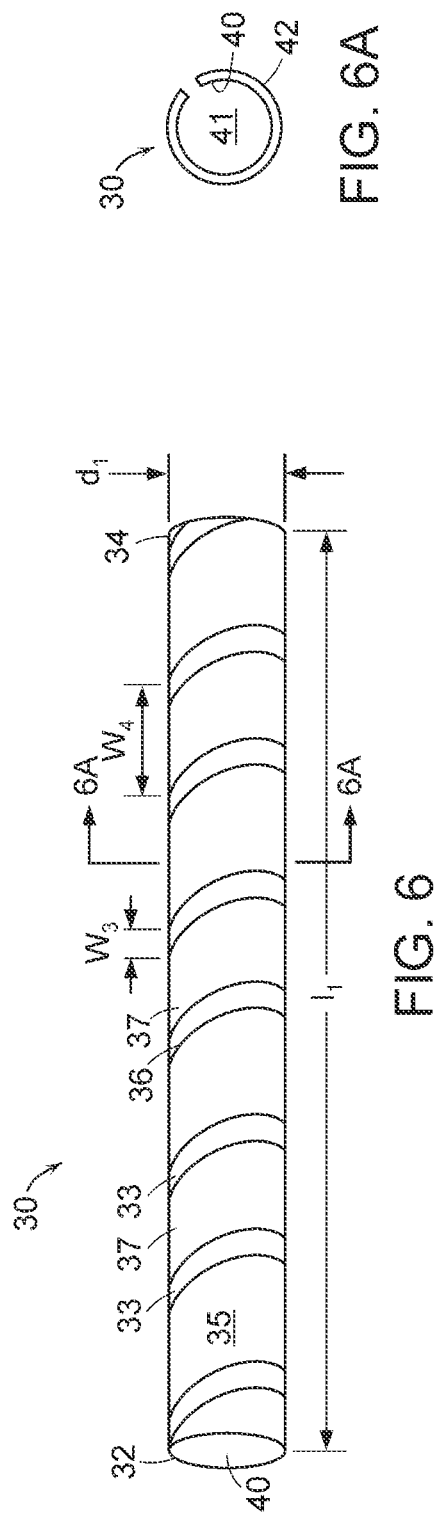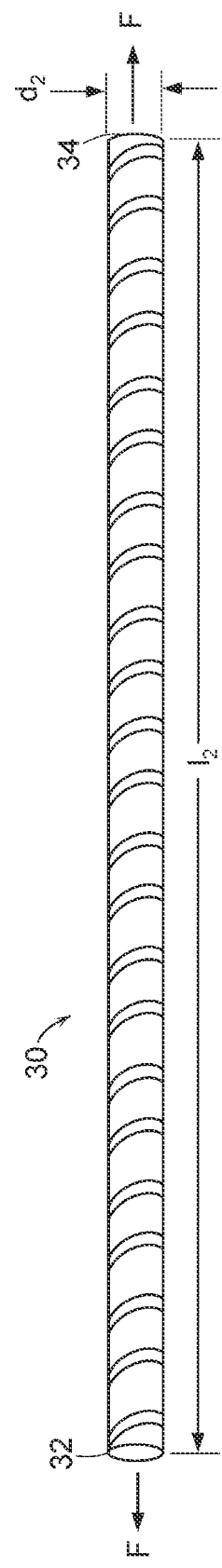
FIG. 6
FIG. 6A
FIG. 7

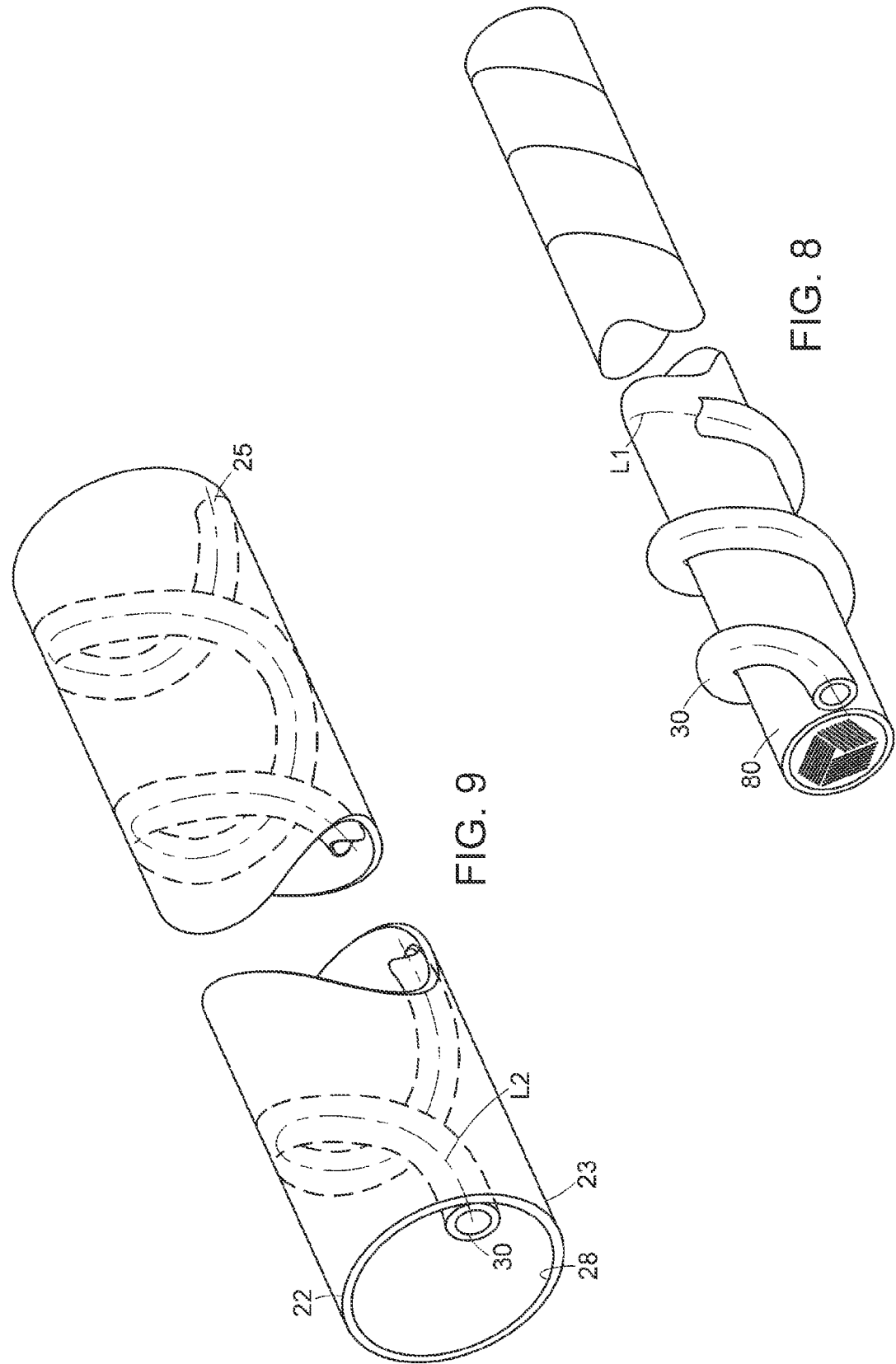

SUPERCONDUCTING CABLE ASSEMBLY AND METHOD OF ASSEMBLY

BACKGROUND OF THE INVENTION

1. Field of the Invention

The present invention relates to flexible electrical conductors, particularly, superconducting wire bundles within a flexible cryostat.

2. Description of the Background Art

Lightweight conductors that transmit large amounts of electric current without significant loss have numerous applications. For example, in electro-refining applications such as aluminum production processes, high amounts of current are required. Other applications requiring light-weight, high-current conductors are naval ships. Naval ships, typically formed of ferromagnetic materials and thus having a substantive magnetic field, are outfitted with complex systems of electromagnetic windings referred to as degaussing cables which serve to reduce the magnetic field of the ship. This permits the naval ships to evade magnetic sensitive ordinances or devices such as mines that are triggered by the ship's large magnetic field.

To accommodate the high-current requirements in the exemplary applications described above, large diameter wires, typically made of copper or aluminum, are generally utilized. However, this leads to undesirably heavy, bulky, and inflexible cables. Recently, it has been proposed to replace the large diameter conventional wire cables with conductors formed of high-temperature superconducting (HTS) materials. As used herein, a high temperature superconductor (HTS) material refers to a material that can maintain superconducting behavior at temperatures of 20 K and higher (i.e., critical temperature, $Tc \geq 20$ K). HTS cables are disclosed in co-pending U.S. patent application Ser. No. 11/880,567, the contents of which are incorporated by reference herein. Accordingly, the HTS cables afford greater flexibility, reduced weight, and high current carrying capacity, thereby having significant advantages over the conventional wire cables.

Such HTS cables generally include a flexible cryostat, in which is disposed a plurality of superconducting conductors. For example, the conductors may be provided as flat wires (tapes), and a plurality of flat wires are arranged in layers to form a stack of HTS flat wires. Two or more stacks of HTS flat wires may be arranged together to form a stack superstructure. The stack superstructure is maintained in the desired configuration by providing the conductors with an outer insulative wrap, whereby an HTS wire bundle (cable) is formed. One or more HTS wire bundles are disposed within the cryostat, which is configured to maintain the individual HTS wires at a temperature which permits the HTS wires to exhibit the property of superconductivity.

However, in order to facilitate assembly of the HTS wire bundle within the cryostat, and to provide a coolant flow path along the length of the HTS wire bundle, the inner diameter of the cryostat is generally somewhat larger than that of the outer dimension of the HTS wire bundle disposed therein. This can be problematic since, in use, the HTS wire bundle is subject to vibration which causes degradation in bundle insulation over time. In some cases, such degradation leads to undesirable conductor-to-conductor or conductor-to-cryostat short circuits. Moreover, localized insulation wear also occurs at intervals along the length of the HTS cable at locations corresponding to that of cable retaining members.

SUMMARY

An HTS cable assembly is provided which includes an elongate cryostat, an HTS wire bundle disposed longitudinally within the cryostat, and plural support members disposed between the HTS wire bundle and the cryostat. The support members are elongate, tubular members having resiliency in both the axial and radial directions. The support members are disposed between the HTS wire bundle and the inner surface of the cryostat in an arrangement that maintains and supports the HTS wire bundle in a spaced-apart relationship with respect to the inner surface of the cryostat. In addition, the plural support members are configured to substantially prevent relative movement between the HTS wire bundle and the cryostat.

In one aspect, a superconducting cable assembly is provided, the assembly including an elongate cryostat, one or more electrical conductors formed of a superconducting material, the conductors disposed longitudinally within the cryostat, and plural support members disposed between the conductors and the cryostat, the support members arranged so as to maintain the conductors in a spaced-apart relationship with respect to an interior wall of the cryostat.

Embodiments of this aspect include one or more of the following features: The support members are configured to provide support along a longitudinal length of the conductors. Each support member includes a generally tubular body that is both radially and longitudinally resilient. Each support members includes a tube having an opening, the opening configured to provide the tube with longitudinal resiliency. In some embodiments, the opening includes a slit extending from one end of the tube to an opposed second end of the tube along a helical path.

In addition, each support member may include a cylindrical helix having a longitudinal axis, and a line of action of a support force corresponding to the force imposed on the conductors by the support member lies in a direction orthogonal to the longitudinal axis of the support member. The support member includes resiliency both in the direction of the longitudinal axis, and in a direction orthogonal to the longitudinal axis. Each support member is configured to be in contact with the conductors along a contact line which extends from a first end of the conductors to a second end of the conductors. In some embodiments, the contact line extends in a helical path about the outer surface of the at least one electrical conductor. The contact line of one support member does not intersect the contact lines of the respective other support members.

Further, the support members extend continuously along the axial length of the cryostat, and are substantially equidistantly spaced about the conductors. The equidistant spacing of the support members is maintained with regular intervals of wire fixturing. The support members extend longitudinally within the cyrostat along a helical path. The support members define a conduit in which sensor leads are disposed.

Still further, the conductors include multiple electrical conductors formed of superconducting material. The conductors are wrapped in an overwrap, the overwrap including a plastic sleeve having a slit extending from a first end of the sleeve to a second end of the sleeve along a helical path, the electrical conductors are coaxial with the cryostat, and the support members reside between the at least one conductor and the cryostat. Each support member includes a tube having a slit extending from one end of the tube to an opposed second end of the tube along a helical path, the slit formed in the overwrap includes a pitch that is opposed in direction relative to a pitch of the slit formed in each support member. The pitch of the slit formed in both the overwrap and support members may be about 1 turn per meter.

In another aspect, a superconducting cable assembly is provided, the assembly including an elongate cryostat, one or more electrical conductors formed of a superconducting material, the conductors disposed longitudinally within the cryostat, and support members disposed between the conductors and the cryostat, each support member including an elongate, generally tubular body that is both radially and longitudinally resilient.

Embodiments of this aspect include one or more of the following features: The support members are configured to provide support along a longitudinal length of the at least one conductor. The support members arranged so as to maintain the at least one conductor in a spaced-apart relationship with respect to an interior wall of the cryostat. Each support member includes an opening, the opening configured to provide the tubular body with longitudinal resiliency. In some embodiments, the opening includes a slit extending from one end of the tubular body to an opposed second end of the tubular body along a helical path. The support members extend continuously along the axial length of the cryostat. The support members are substantially equidistantly spaced about the conductors. The support members extend longitudinally within the cyrostat along a helical path. The support members define a conduit in which sensor leads are disposed.

In still another aspect, a method of assembling a superconducting cable assembly is provided. The method of assembling may include the following method steps:

Positioning plural elongate support members having a radially and longitudinally resilient bodies about a periphery of one or more superconducting electrical conductors so that a longitudinal axis of each of the support members is generally aligned with the a longitudinal axis of the conductors, and so that each support member is equidistantly spaced apart with respect to the other support members.

Stretching the support members whereby an outer diameter of each support member is reduced relative to an outer diameter of the support member in an unconstrained state;

Inserting the conductors and support members into an elongate cryostat so that a longitudinal axis of the conductors is substantially aligned with a longitudinal axis of the cryostat, and releasing the stretch of the support members so that the outer diameter of each support member resiliently expands, and so that the conductors are supported by the support members within the cryostat so as to be in a spaced-apart relationship with respect to an interior wall of the cryostat.

Embodiments of this aspect include one or more of the following features: The cryostat, the conductors, and support members are respectively dimensioned such that, when the stretch is released, the support members resiliently expand to a constrained diameter that is less than the diameter of the support members in the unconstrained state, whereby the support members exert a radially directed support force on the conductors. The step of stretching is achieved by applying a tensile force to opposed ends of the support members.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 3 is a side view of an isolated triad stack superstructure arrangement of HTS flat wires.
FIG. 3A is a is a cross-sectional view of the triad stack superstructure arrangement of FIG. 3.
FIG. 4 is a is a side view of an isolated overwrap.
FIG. 4A is a is a cross-sectional view of the overwrap of FIG. 4.
FIG. 5 is a side view of an isolated HTS wire bundle.
FIG. 6 is a side view of an isolated support member.
FIG. 6A is a cross-sectional view of the support member of FIG. 6.
FIG. 7 is a side view of the isolated support member of FIG. 6 under an axially applied tensile force.
FIG. 8 is a perspective view of an HTS wire bundle showing a single support member extending along an outer surface thereof along a helical line L1.
FIG. 9 is a perspective view of an inner housing of the cryostat showing a single support member extending along an inner surface thereof along a helical line L2.

DETAILED DESCRIPTION

Figure 1:
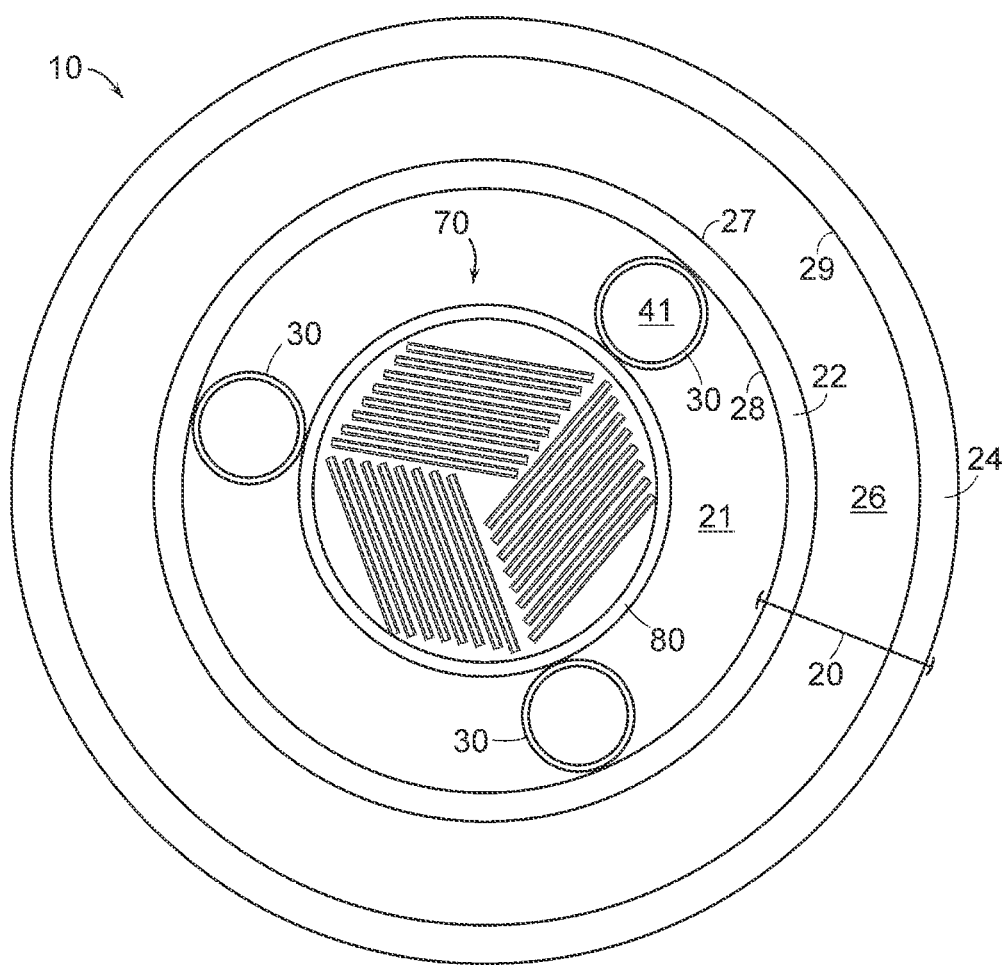
FIG. 1 is a cross-sectional view of an HTS cable assembly.

Referring now to FIG. 1, a superconducting cable assembly 10 is shown which includes a cryostat 20, an HTS wire bundle 70 disposed longitudinally within the cryostat 20, and plural support members 30 disposed between the HTS wire bundle 70 and the cryostat 20. Here, three support members 30 are shown.

As used herein, the term cryostat 20 refers to an assembly of elongate, coaxially arranged stainless steel tubular housings 22, 24, in which a cryogenic fluid (coolant) is disposed within the interior space 21 of the inner housing 22, and an intermediate space 26 is provided between the inner housing 22 and the outer housing 24. The intermediate space 26 is vacated so that a vacuum exists in the intermediate space 26. In addition, a layer of insulation (not shown) may be provided on an inner surface 29 of the outer housing 24, or on an outer surface 27 of the inner housing 22. The length of the cryostat is determined by the desired length of the HTS wire bundle 70, and thus can be in the range of a few meters to hundreds of meters. Fittings (not shown) are provided at respective opposed ends 23, 25 of the cryostat which permit the coolant, such as helium gas or liquid nitrogen, to be injected under pressure into the open interior space 21 defined by the inner surface 28 of the inner housing 22. The coolant, which flows between the respective opposed ends 23, 25 of the cryostat 20, serves to maintain the HTS wires 72 at a temperature which permits the HTS wires 72, and thus the HTS wire bundle 70, to exhibit the property of superconductivity.

The HTS wire bundle 70 is formed of multiple HTS wires 72. In this particular embodiment, the HTS wire is a "flat" wire, that is, the HTS wire is formed to have a generally rectangular cross section in which the wire width is large relative to the wire depth. The size of the cross-sectional area of the HTS flat wire is related to the current carrying capacity of the wire such that an increase in the cross sectional area increases the current carrying capacity of the wire. The particular cross sectional area of the HTS wire is determined by the specific requirements of the particular application. In addition, the particular type of HTS wire employed is also determined by the specific requirements of the particular application. Examples of types of high temperature superconductors that may be employed in the HTS wire bundle 70 include, but are not limited to, copper oxide superconductors such as bismuth strontium calcium copper oxide (BSCCO), yttrium barium copper oxide (YBCO), and magnesium diboride ($MgB_2$).

In some embodiments, individual flat wires 72 may be provided with a coating 76 of a compliant material prior to stacking. The coating material 76 may be a conductor, a semiconductor, or an insulator. For example, the coating material 76 may be Kapton® (registered trademark of E. I. du Pont de Nemours and Company) polyimide film.

Figure 2:
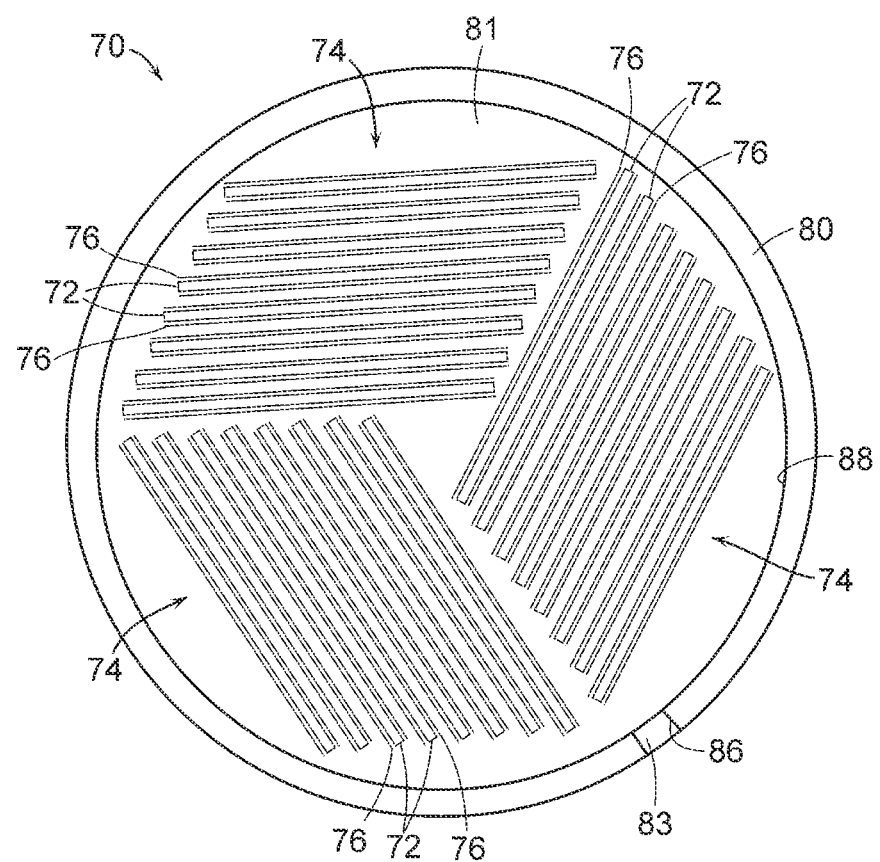
FIG. 2 is a cross-sectional view of the HTS wire bundle of FIG. 1.

In some embodiments, several HTS flat wires 72 are arranged in a stacked configuration 74, although the inventive concept described herein is not limited to a stacked configuration. As seen in FIG. 2, individual HTS flat wires 72 may be stacked so that adjacent HTS flat wires 72 may be slightly offset in the width direction. In this case, the resulting stack 74 has a cross-sectional shape that is a parallelogram such as a rhomboid. The stack 74 is maintained in the desired configuration by any appropriate means, such as wrapping the stack 74 with polymer, paper, metal foil strip or the like.

In the illustrated embodiment, each stack 74 is formed of eight HTS flat wires 72. However, the inventive concept described herein is not limited to this number, and each stack 74 may be constituted by any number of HTS flat wires 72. In addition, several stacks 74 may be assembled together to form a stack superstructure 78 (FIGS. 3, 3A). In the illustrated embodiment, three stacks 74 of HTS flat wires 72 are assembled to form a triad superstructure 78 having a substantially hexagonally-shaped cross-section. However, any number of stacks 74 may be assembled in any desired arrangement to form a stack superstructure 78. The number of stacks 74 employed and particular configuration of the stacks 74 is determined by the specific requirements of the particular application.

Upon forming a suitable stack superstructure 78 as described above, the entire superstructure may be rotated about the HTS cable axis, i.e., an axis that is perpendicular to the plane of the hexagonal cross-sectional structure, to obtain a cable having a twist along its longitudinal axis (not shown). The twist may be imparted so that the pitch is in a continuous spiral mode. For example, in the spiral mode, the cable can be twisted in one direction about its axis throughout the length of the cable. Suitable approaches that can provide advantage of simple manufacturing will be readily apparent to one of ordinary skill in the art.

Imparting a twist along the axis of the HTS cable may provide the following benefits. First, the twist may impart improved flexibility to the HTS cable due to the reduction of required bending forces. Second, the twist may impart improved bend tolerance to smaller diameters before damage to the HTS cable (as measured by critical current ($I_c$) degradation) due to local strain compensation taking place. Third, the twist may impart reduced power loss to the HTS cable when operating in an ac or ramped field mode, especially if combined with insulation or semiconducting separation layer between each HTS tapes.

In certain embodiments, shapes and configurations of stacks and stack superstructures may be chosen to obtain simplicity of manufacture, high degree of cross-section occupancy by HTS tape resulting in a high current density, reduced effective diameter of the superstructure, and improved overall bend tolerance.

The stack superstructure 78 is maintained in the desired configuration by any appropriate means. In some embodiments, the stack superstructure 78 is maintained in the desired configuration by providing the stack superstructure 78 with an overwrap 80 formed of polymer tape or a preformed polymer helix such as a polytetraflouroethylene (TEFLON) wrap. As used herein, the term HTS wire bundle 70 refers to a stack superstructure 78 surrounded by a helical overwrap 80.

The triad superstructure 78 of FIG. 2 is shown in isolation in FIG. 3. For simplicity of illustration, the respective stacks 74 are illustrated as extending longitudinally without an axial twist. However, it is understood that the triad superstructure is provided with the above described axial twist.

Referring now to FIG. 4, a helical overwrap 80 is shown in isolation. In some embodiments, the overwrap 80 includes an elongate tube 85 provided with a helical 86 extending longitudinally from a first end 82 of the overwrap 80 to an opposed second end 84 thereof. As used herein, the term slit refers to an opening extending through the thickness of the material. In some embodiments, the overwrap helical slit 86 has In some embodiments, the overwrap helical slit 86 has an axial dimension $w_1$ that is small relative to the axial dimension $w_2$ of each turn 87, such that a space 83 is provided between adjacent turns 87, 87 of the helical wrap 80. When the overwrap 80 is disposed about the triad superstructure 78 as shown in FIG. 5, the space 83 permits the coolant fluid to flow into the open interior space 81 defined by the inner surface 88 of the overwrap 80, permitting direct contact between the coolant and the HTS wires 72. In addition, the space 83 permits flexibility of the HTS wire bundle 70.

Referring again to FIG. 1, plural support members 30 are disposed between the HTS wire bundle 70 and the inner surface 28 of the cryostat 20 in an arrangement that maintains and supports the wire bundle 70 in a spaced-apart relationship with respect to the inner surface 28 of the cryostat. In addition, the plural support members 30 are configured to substantially prevent relative movement between the wire bundle 70 and the cryostat.

Each support member 30 (FIGS. 6, 6A) includes an elongate tube 35 that is both radially and longitudinally resilient. In some embodiments, each support member 30 is provided with a helical slit 36 extending longitudinally from a first end 32 of the support member 30 to an opposed second end 34 thereof. As a result, tube 35 has the appearance of a coil spring having plural turns 37. In addition, the tube 35 also takes on some characteristics of a coil spring, such as resiliency in both the axial and radial directions, as well as flexibility and resiliency in bending.

Figure 15A:
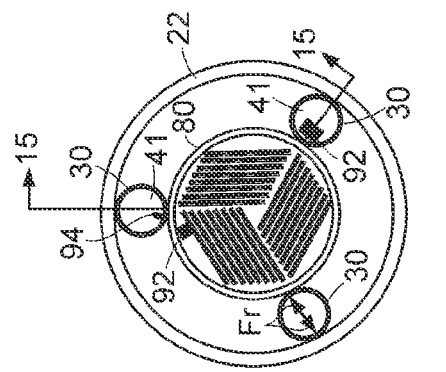
FIG. 15A is a is a cross-sectional view of the HTS cable assembly of FIG. 15.

The helical structure of the support member 30 results in a further advantageous property in which the diameter of the support member 30 may be reduced by increasing the axial length of the support member 30. Such axial lengthening can be achieved by applying an axial tensile force $F_t$ to the opposed ends 32, 34 of the support member 30. Thus, a support member 30 which is free from external forces (shown in FIG. 6), that is, in an unconstrained state, has a corresponding unconstrained diameter $d_1$ and length $l_1$. Upon application of an axial tensile force $F_t$ to the opposed ends 32, 34 of the support member 30 (shown in FIG. 7), its diameter decreases relative to the unconstrained diameter ($d_2<d_1$), its length increases relative to the unconstrained length ($l_2>l_1$), and its cross sectional shape remains substantially circular. Generally, the diameter of the helical support member 30 decreases with increasing axial tensile force $F_t$ and increasing axial length of the support member 30. Upon release of the axial tensile force $F_t$, the support member 30 will resiliently return to its unconstrained diameter and axial length. In addition, upon release of the axial tensile force $F_t$ when the support member 30 is in a constrained state, for example, when the support member 30 resides in a space having a dimension that is less than the unconstrained diameter, the support member 30 will resiliently expand to fill the available space while substantially retaining its circular cross sectional shape. That is, it will expand to an outer diameter that is substantially the same as the diameter of the available space. In the constrained state, the support member 30 exerts a radially-directed force $F_r$ on the constraining structure(s) (FIG. 15A).

The helical structure of the support member 30 results in a still further advantageous property in which the coolant is permitted to flow longitudinally within the interior space 41 of the support member 30. Moreover, coolant flowing within the interior space 21 of the inner housing 22 of the cryostat 20 is able to flow freely through the support member helical slit 36, whereby good coolant flow through the interior space 21 is promoted and maintained.

The helical slit 36 of the support members 30 may include a pitch that is opposed in direction relative to a pitch of the overwrap 80. By providing the support members 30 with a pitch that is opposed in direction relative to a pitch of the overwrap 80, a uniform outer diameter of the assembly is maintained. In addition, a condition is avoided in which a support member 30 becomes settled in the helical vacancy of the overwrap 80 corresponding to the overwrap slit 86. The undesirable effect of this condition is that the support member 30 would effectively cover the slit 86, preventing coolant from entering into the interior space 81 of the overwrap 80.

In some embodiments, for example, the pitch of the slits 36, 86 respectively formed in the support members 30 and the overwrap 80 are about 1 turn per meter, although the pitch of the respective slits is not limited to 1 turn per meter. In addition, the support member slit 36 may have a pitch which is different than that of the overwrap slit 86.

Figure 10:
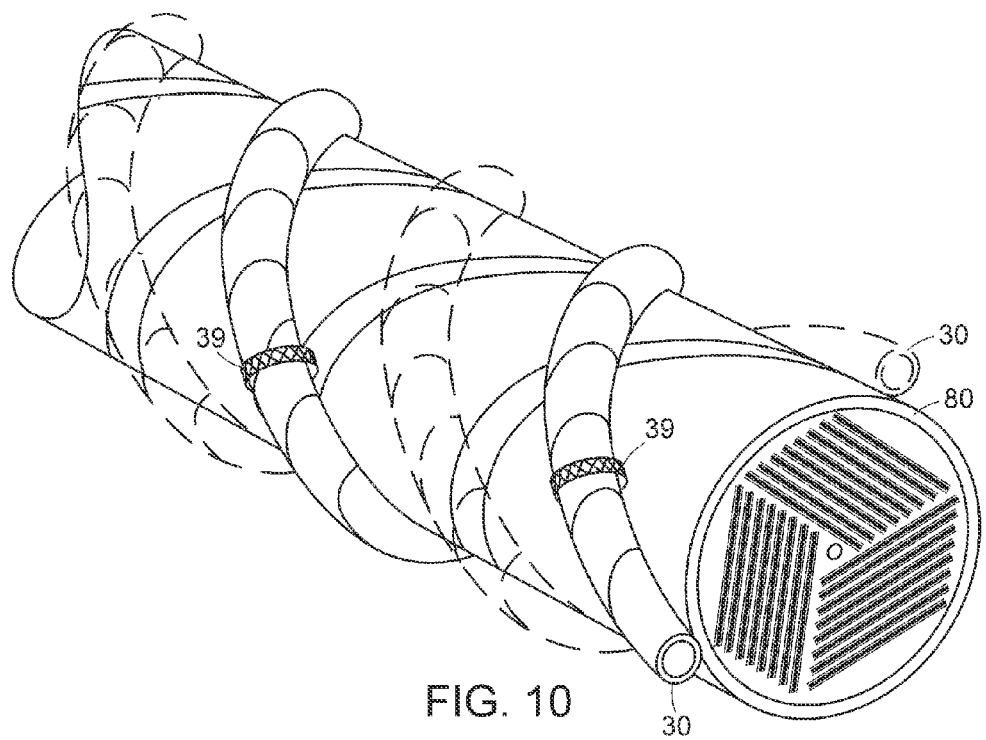
FIG. 10 is a perspective view of an HTS wire bundle showing two support members extending along an outer surface thereof along non-intersecting helical paths.
Figure 11:
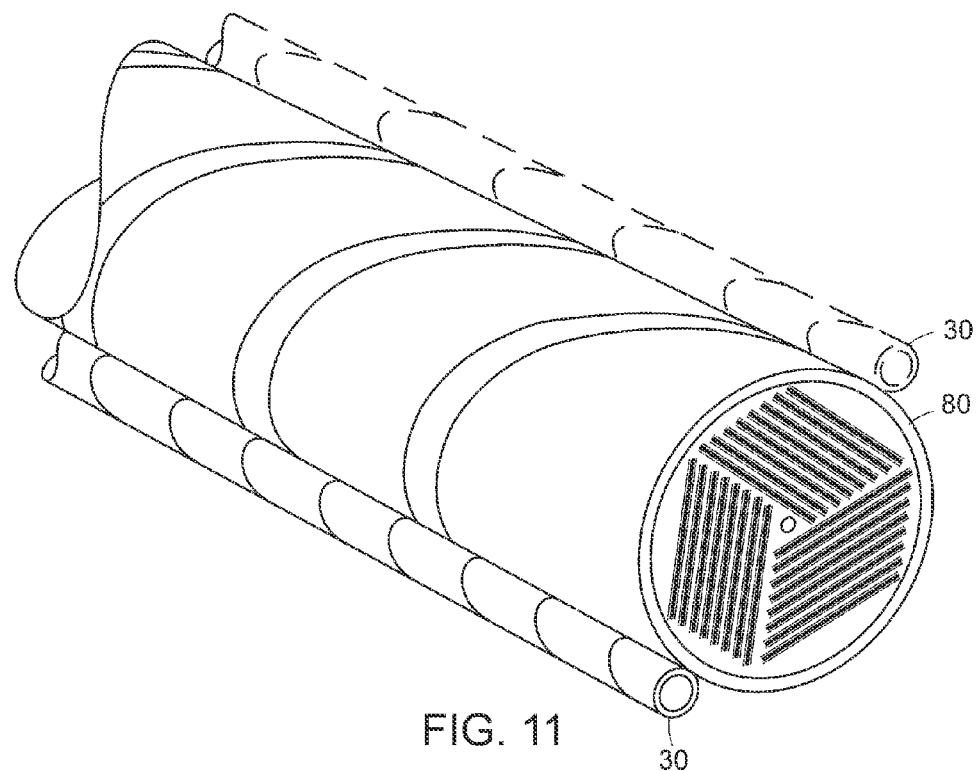
FIG. 11 is a perspective view of an HTS wire bundle showing two support members extending along an outer surface thereof along linear paths.

Each support member 30 extends continuously along the axial length of the HTS wire bundle 70. In particular, each support member 30 is configured to be substantially contiguous with an outer surface 89 of the overwrap 80 along a first contact line L1 which extends from the first end 82 to the second end 84 of the overwrap 80 (FIG. 8). That is, each support member 30 is contiguous with the outer surface 89 except at slit spaces 33. In addition, each support member is configured to be substantially contiguous with an inner surface 28 of the inner housing 22 of the cryostat 20 along a second contact line L2 which extends from the first end 23 to the second end 25 of the cryostat 20 (FIG. 9). The first contact line L1 and second contact line L2 extend along opposed sides of the outer surface 42 of the support member 30. In some embodiments, the first contact line L1 extends in a helical path along the outer surface 89 of the overwrap 80 (FIG. 10), and the second contact line L2 extends in a helical path along the inner surface 28 of the cryostat 20. In other embodiments, the first contact line L1 extends in a linear path along the outer surface 89 of the overwrap 80 (FIG. 11), and the second contact line L2 extends in a linear path along the inner surface 28 of the cryostat 20. In the embodiments of both FIG. 10 and FIG. 11, the respective first and second contact lines L1, L2 of each support member 30 do not intersect the corresponding contact lines L1, L2 of the remaining support members 30.

In some embodiments, the support member helical slit 36 has an axial dimension $w_3$ that is small relative to the axial dimension $w_4$ of each turn 37 of the support member, such that a space 33 is provided between adjacent turns 37 of the helical support member 30. These relative dimensions provide a structure in which the outer surface 42 of the support member 30 provides substantially continuous support along the first L1 and second L2 contact lines, whereby localized wear is avoided due to distribution of the contact load along the contact lines L1, L2.

Figure 12:
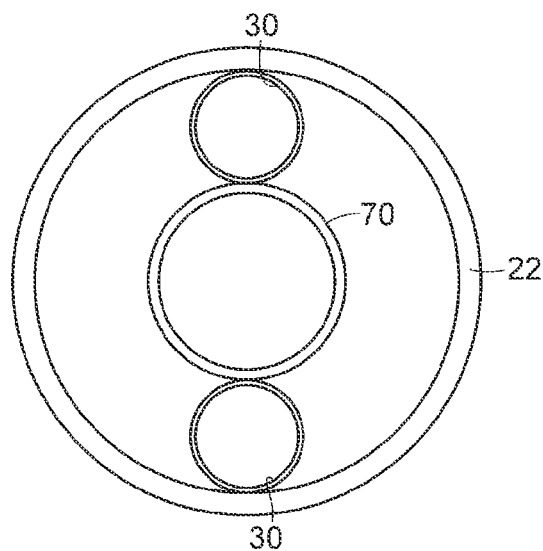
FIG. 12 is a is a cross-sectional view of a HTS cable assembly having two equidistantly spaced support members disposed between the cryostat and the HTS wire bundle.
Figure 13:
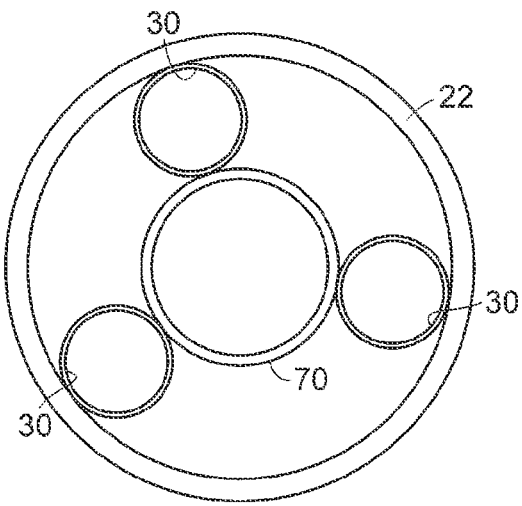
FIG. 13 is a is a cross-sectional view of a HTS cable assembly having three equidistantly spaced support members disposed between the cryostat and the HTS wire bundle.
Figure 14:
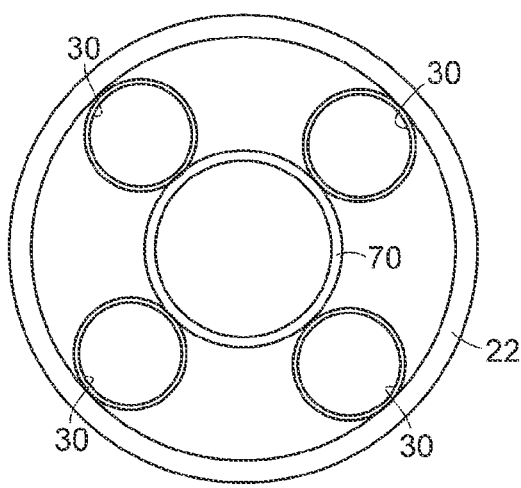
FIG. 14 is a is a cross-sectional view of a HTS cable assembly having four equidistantly spaced support members disposed between the cryostat and the HTS wire bundle.

The plural support members 30 are arranged between the HTS wire bundle 70 and the cryostat 20 so as to maintain the HTS wire bundle 70 in a spaced-apart relationship with respect to the inner surface 28 of the cryostat 20. In some embodiments, two support members 30 are positioned on opposed sides of the HTS wire bundle 70 within the cryostat 20 (FIG. 12). In other embodiments, three support members 30 are positioned equidistantly about the HTS wire bundle 70 (FIG. 13). In still other embodiments, more than three support members can be provided, the support members disposed equidistantly about the HTS wire bundle (FIG. 14).

In some embodiments, the plural support members 30 are provided with an unconstrained diameter that is slightly greater than half the difference between the outer diameter of the HTS wire bundle 70 and the inner diameter of the inner housing 22 of the cryostat 20. As a result, each support member 30 is disposed within the open interior space 21 of the cryostat 20 such that the diameter is constrained to be slightly less than the unconstrained diameter, whereby a radially-directed support force is exerted by each support member 30 on the inner surface 28 of the cryostat 20 and on the outer surface of the HTS wire bundle 70. When each support member 30 has the same unconstrained diameter, and each support member 30 is disposed equidistantly about the HTS wire bundle 70, the HTS wire bundle 70 is supported so as to be coaxial with the cryostat 20, and is restrained from movement relative to the cryostat 20.

In some embodiments, the support members 30 are maintained in their desired relative positions as a result of friction forces between respective assembly components due to the radial resiliency of the support member 30. In other embodiments, the support members 30 are maintained in their desired relative positions by using fixturing at regular axial intervals. Such fixtures may be of any appropriate type or material. For example, wire fixtures 39 (FIG. 10) may be applied at regular axial intervals, such as once per full rotation of the support member around the wire bundle 70.

Figure 15:
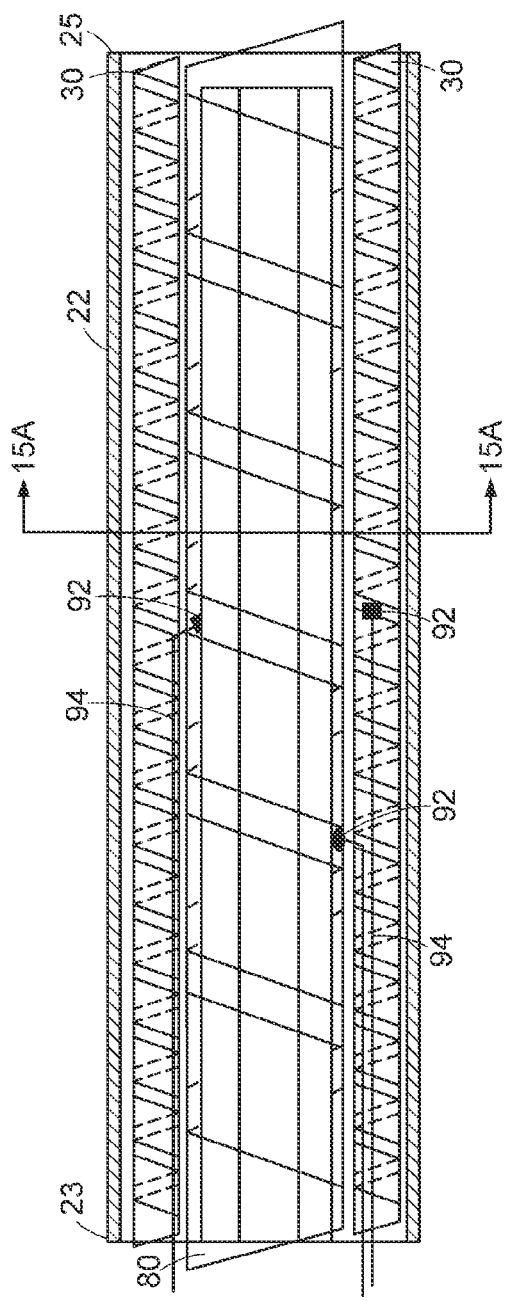
FIG. 15 is a side sectional view of the HTS cable assembly.

In some embodiments, the superconducting cable assembly 10 also includes a plurality of sensors 92 disposed at one or more locations along the axial length thereof for monitoring the operation of the assembly 10 during use. Such sensors 92 may be used to detect one or more of, for example, the temperature, voltage, and/or current of HTS wires 72, stacks 74 and/or wire bundles 70, coolant pressure within the interior space 21, and generated magnetic field. In some embodiments, the support member 30 serves as a conduit for the sensor wire leads 94 and sensors 92 disposed within the assembly 10. For example, the sensor wire leads 94 may be disposed within, and extend along the length of, the hollow interior space 41 of the support member 30 (FIGS. 15, 15A). For some purposes, at a desired location along the axial length of the wire bundle 70, a sensor 92 exits from the interior space 41 by passing through the slit 36 formed in the support member 30. In addition, because the overwrap 80 includes overwrap slit 86, the sensor 92 enters into the inner space 81 of the HTS wire bundle 70, and detects the appropriate parameter of the HTS wires 72, stacks 74, and/or wire bundle 70. For other purposes, at a desired location along the axial length of the wire bundle 70, a sensor 92 remains within the interior space 41 of the support member 30, and detects the appropriate parameter of the HTS wires 72, stacks 74, and/or wire bundle 70 from that location.

In some embodiments, the above described superconducting cable assembly 10 is assembled according to the following method steps:

The support members 30 are positioned about a periphery of the wire bundle 70 so that a longitudinal axis of each of the support members 30 is generally aligned with the a longitudinal axis of the wire bundle 70, and so that each support member 30 is equidistantly spaced apart about a circumference of the wire bundle 70 with respect to the other support members 30.

The elongate support members are stretched longitudinally by applying an axially directed tensile force $F_t$ to opposed ends 32, 34 of the elongate support members 30 whereby an outer diameter of each support member 30 is reduced (i.e., d2, FIG. 7) relative to an outer diameter d1 of the support member 30 in an unconstrained state. While maintaining the applied tensile force $F_t$, the wire bundle 70 and support members 30 are inserted into the cryostat 20 so that a longitudinal axis of the wire bundle 70 is substantially aligned with a longitudinal axis of the cryostat 20. The reduction in outer diameter of the support members 30 eases insertion of the support members 30 and wire bundle 70 into the cryostat 20.

Once the wire bundle 70 and support members are disposed within the cryostat 20, the tensile force $F_t$ is released from the opposed ends 32, 34 of the support members 30 so that the outer diameter of each support member resiliently expands, and so that the wire bundle 70 is supported by the support members 30 within the cryostat 20 in a spaced-apart relationship with respect to an interior wall of the cryostat 20. In some embodiments, the cryostat 20, wire bundle 70, and support members 30 are respectively dimensioned such that, when the tensile force $F_t$ is released, the support members 30 resiliently expand to a constrained diameter that is less than the unconstrained diameters $d_1$ of the support members 30, whereby the support members 30 exert a radially directed support force $F_r$ on the wire bundle 70 and the cryostat 20.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed, is:

1. A superconducting cable assembly, the assembly comprising:
    an elongate cryostat;
    at least one electrical conductor formed of a superconducting material, the at least one conductor disposed longitudinally within the cryostat;
    plural support members disposed between the at least one conductor and a radially inward facing surface of an innermost wall of the cryostat, the support members arranged so as to maintain the at least one conductor in a spaced-apart relationship with respect to the cryostat.

2. The superconducting cable assembly of claim 1, wherein each support members comprises a tube having an opening, the opening configured to provide the tube with longitudinal resiliency.

3. The superconducting assembly of claim 2, wherein the opening comprises a slit extending from one end of the tube to an opposed second end of the tube along a helical path.

4. The superconducting cable assembly of claim 1, wherein each support member comprises a cylindrical helix having a longitudinal axis, and
    a line of action of a support force corresponding to the force imposed on the at least one conductor by the support member lies in a direction orthogonal to the longitudinal axis of the support member.

5. The superconducting cable assembly of claim 4, wherein the support member comprises resiliency both in the direction of the longitudinal axis, and in a direction orthogonal to the longitudinal axis.

6. The superconducting cable assembly of claim 1, wherein each support member is configured to be in contact with the at least one conductor along a contact line which extends from a first end of the at least one electrical conductor to a second end of the at least one electrical conductor.

7. The superconducting cable assembly of claim 6, wherein the contact line extends in a helical path about the outer surface of the at least one electrical conductor.

8. The superconducting cable assembly of claim 6, wherein the contact line of one support member does not intersect the contact lines of the respective other support members.

9. The superconducting cable assembly of claim 1, wherein the support members are substantially equidistantly spaced about the at least one electrical conductor.

10. The superconducting cable assembly of claim 9, wherein
    the equidistant spacing of the support members is maintained with regular intervals of wire fixturing.

11. The superconducting cable assembly of claim 1, wherein
    the at least one conductor comprises plural electrical conductors formed of superconducting material.

12. The superconducting cable assembly of claim 11, wherein
    the plural electrical conductors are wrapped in an overwrap, the overwrap including a plastic sleeve having a slit extending from a first end of the sleeve to a second end of the sleeve along a helical path,
    the plural electrical conductors are coaxial with the cryostat, and
    the support members reside between the at least one conductor and the cryostat.

13. The superconducting cable assembly of claim 12, wherein
    each support member comprises a tube having a slit extending from one end of the tube to an opposed second end of the tube along a helical path,
    the slit formed in the overwrap comprises a pitch that is opposed in direction relative to a pitch of the slit formed in each support member.

14. The superconducting cable assembly of claim 13, wherein
    the pitch of the slit formed in both the overwrap and support members is about 1 turn per meter.

15. The superconducting cable assembly of claim 1, wherein the support members are configured to provide support along a longitudinal length of the at least one conductor.

16. The superconducting cable assembly of claim 1, wherein
each support member comprises a generally tubular body that is both radially and longitudinally resilient.

17. The superconducting cable assembly of claim 1, wherein
the support members extend continuously along the axial length of the cryostat.

18. The superconducting cable assembly of claim 1, wherein
the support members extend longitudinally within the cyrostat along a helical path.

19. The superconducting cable assembly of claim 1, wherein
the support members define a conduit in which sensor leads are disposed.

20. The superconducting cable assembly of claim 1, wherein
the cryostat is flexible.

21. A superconducting cable assembly, the assembly comprising:
an elongate cryostat;
at least one electrical conductor formed of a superconducting material, the at least one conductor disposed longitudinally within the cryostat;
plural support members disposed between the at least one conductor and a radially inward facing surface of an innermost wall of the cryostat, each support member comprising an elongate, generally tubular body that is both radially and longitudinally resilient.

22. The superconducting cable assembly of claim 21, wherein
each support member comprises an opening, the opening configured to provide the tubular body with longitudinal resiliency.

23. The superconducting assembly of claim 22, wherein
the opening comprises a slit extending from one end of the tubular body to an opposed second end of the tubular body along a helical path.

24. The superconducting cable assembly of claim 21, wherein
the support members are configured to provide support along a longitudinal length of the at least one conductor.

25. The superconducting cable assembly of claim 21, wherein
the support members arranged so as to maintain the at least one conductor in a spaced-apart relationship with respect to an interior wall of the cryostat.

26. The superconducting cable assembly of claim 21, wherein
the support members extend continuously along the axial length of the cryostat.

27. The superconducting cable assembly of claim 21, wherein
the support members are substantially equidistantly spaced about the at least one electrical conductor.

28. The superconducting cable assembly of claim 21, wherein
the support members extend longitudinally within the cyrostat along a helical path.

29. The superconducting cable assembly of claim 21, wherein
the support members define a conduit in which sensor leads are disposed.

* * * * *